US008442076B1

(12) United States Patent
Khlat

(10) Patent No.: US 8,442,076 B1
(45) Date of Patent: May 14, 2013

(54) PRECISE TIMING CONTROL OF TD-SCDMA VIA AN ASYNCHRONOUS SERIAL INTERFACE

(75) Inventor: Nadim Khlat, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 229 days.

(21) Appl. No.: 12/894,404

(22) Filed: Sep. 30, 2010

Related U.S. Application Data

(60) Provisional application No. 61/247,295, filed on Sep. 30, 2009.

(51) Int. Cl.
*H04J 3/06* (2006.01)
*H04W 56/00* (2009.01)
*H04B 7/216* (2006.01)

(52) U.S. Cl.
USPC ........... 370/520; 370/324; 370/350; 370/508; 370/514; 375/354; 375/356

(58) Field of Classification Search .................. 370/324, 370/342, 345, 350, 503, 508, 514, 520; 375/354, 375/356
See application file for complete search history.

(56) References Cited

U.S. PATENT DOCUMENTS

| 8,054,767 | B2 * | 11/2011 | Choi et al. | 370/280 |
| 2007/0165620 | A1 * | 7/2007 | Li et al. | 370/376 |
| 2009/0061787 | A1 * | 3/2009 | Koller et al. | 455/73 |
| 2010/0034192 | A1 * | 2/2010 | Beamish et al. | 370/350 |
| 2010/0074311 | A1 * | 3/2010 | Kopmeiners | 375/220 |

FOREIGN PATENT DOCUMENTS

EP 2154788 A2 2/2010

* cited by examiner

*Primary Examiner* — Dang Ton
*Assistant Examiner* — Robert M Morlan
(74) *Attorney, Agent, or Firm* — Withrow & Terranova, P.L.L.C.

(57) ABSTRACT

A timing control system includes a counter that is initiated by a time accurate strobe (TAS) signal. A counter value is recorded when a message arrives in a buffer. A baseband integrated circuit (BBIC) calculates an integer number of counter periods and a fraction of a counter period corresponding to a timing correction value received from a base station. The BBIC issues a TAS signal during a counter period that occurs at the integer number of counter periods. At an expiration of the fraction of an ensuing counter period, the first one of a plurality of frame time slots is sent from the buffer to an antenna via a radio frequency integrated circuit (RFIC). The BBIC calculates, then stores in a memory, timing adjust values for the plurality of frame time slots so that each frame time slot can be time adjusted during message transmissions without an issuance of an additional TAS signal.

33 Claims, 5 Drawing Sheets

PRECISE TIMING CONTROL OF TD-SCDMA VIA AN ASYNCHRONOUS SERIAL INTERFACE

RELATED APPLICATIONS

This application claims the benefit of provisional patent application Ser. No. 61/247,295, filed Sep. 30, 2009, the disclosure of which is hereby incorporated herein by reference in its entirety.

FIELD OF THE DISCLOSURE

The present disclosure relates to a method for providing precision timing to data slots that are transmitted from a mobile terminal to a base station.

BACKGROUND

Time Division Synchronous Code Division Multiple Access (TD-SCDMA) requires precise timing control of the receive (RX) and transmit (TX) slots over an air interface. Standards referred to as Digital Radio Frequency (DigRF) version 3 (v3) and version 4 (v4) define a serial asynchronous interface between a radio frequency integrated circuit (RFIC) and a baseband integrated circuit (BBIC) that are typically included in a mobile terminal, such as a cellular handset. In particular, Dig RFv3 and Dig RFv4 provide the asynchronous serial interface between the RFIC and the BBIC with logical, electrical, and timing characteristics needed for physical implementation of the serial asynchronous interface. However, the provided timing characteristics only allow for coarse timing references for initial TX slots using a relatively complex control sequence. What is needed is a simplification of the relatively complex control sequence over the serial asynchronous interface so that precise timing references for all TX slots can be realized.

SUMMARY

The present disclosure meets the need for a simplification of the relatively complex control sequence so that precise timing references for all transmit (TX) slots over the existing serial asynchronous interface can be realized.

In particular, the present disclosure provides a timing control system for a Time Division Synchronous Code Division Multiple Access (TD-SCDMA) and Long Term Evolution Time Division Duplex (LTE-TDD) mobile terminal. The present timing control system includes a radio frequency integrated circuit (RFIC) that is in communication with an antenna, and an asynchronous digital interface that is in communication with the RFIC. A baseband integrated circuit (BBIC) is adapted to perform calculations and issue commands to the RFIC via the asynchronous digital interface. A first-in first-out (FIFO) buffer in communication with the RFIC and the BBIC provides buffering for TX and receive (RX) frame data that is transmitted from or received by the antenna. A memory is provided for storing a plurality of timing adjust values, wherein each of the plurality of timing adjust values is associated with the beginning of a corresponding one of a plurality of frame time slots that are allocated for the TX and RX frame data.

A modulo counter having a maximum count value per counter period is in communication with the RFIC and BBIC for counting an integer number of timing chips. The counter is initiated by an RX time accurate strobe (TAS) signal that commands an initial counter value to be recorded in the memory when an external message arrives in the FIFO buffer from the antenna after a propagation delay through the RFIC. The BBIC is also further adapted to calculate an integer number of counter periods and a fraction of a counter period corresponding to a timing correction value received from a base station. The BBIC issues a TX TAS during a counter period that occurs at the integer number of counter periods. The BBIC is also adapted such that an expiration of a fraction of an ensuing counter period commands an internal message for a first one of the plurality of frame time slots to be sent from the FIFO buffer to the antenna via the RFIC. Further still, the BBIC calculates, then stores in the memory, the plurality of timing adjust values for each one of the plurality of frame time slots that follows the first one of the plurality of frame time slots, so that each one of the plurality of frame time slots can be time-adjusted during message transmissions without an issuance of an additional TX TAS.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
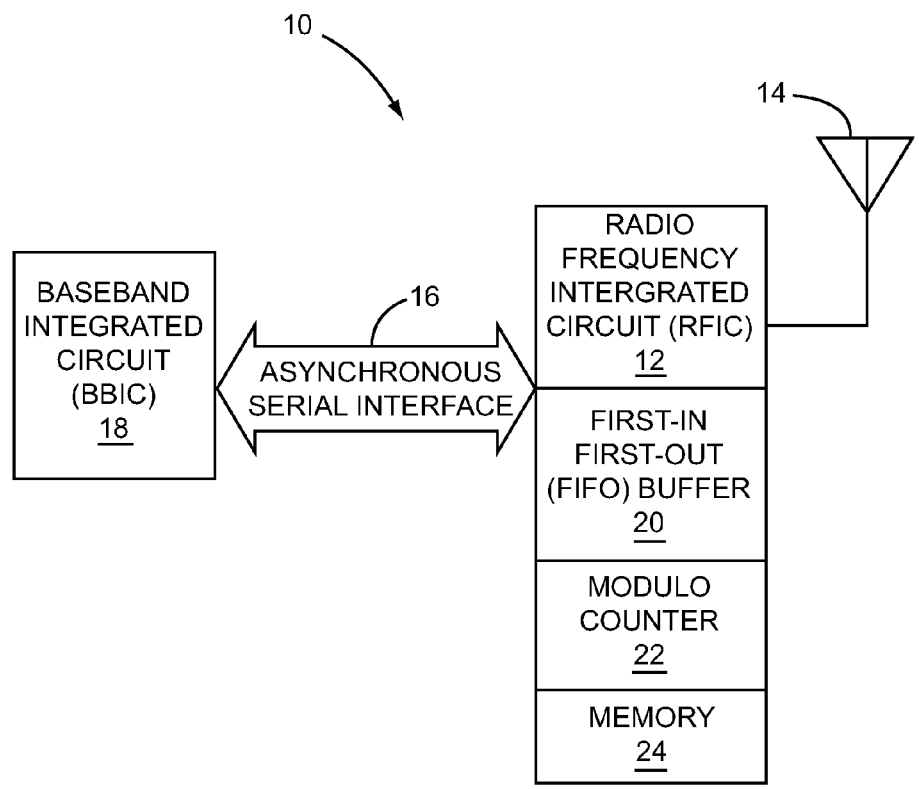
FIG. 1 depicts a timing control system for a Time Division Synchronous Code Division Multiple Access (TD-SCDMA) and Long Term Evolution Time Division Duplex (LTE-TDD) mobile terminal.

FIG. 1 depicts a timing control system 10 for a Time Division Synchronous Code Division Multiple Access (TD-SCDMA) and Long Term Evolution Time Division Duplex (LTE-TDD) mobile terminal. The timing control system 10 includes a radio frequency integrated circuit (RFIC) 12 in communication with an antenna 14. An asynchronous serial digital interface 16 in communication with the RFIC 12 provides a communications pathway between the RFIC 12 and other elements of the timing control system 10. One of the other elements is a baseband integrated circuit (BBIC) 18 that is adapted to perform calculations and issue commands to the RFIC 12 via the asynchronous digital interface 16. A first-in first-out (FIFO) buffer 20 is in communication with the RFIC 12 and the BBIC 18 for buffering transmit (TX) and receive (RX) frame data. A modulo counter 22 in communication with the RFIC 12 and BBIC 18 counts an integer number of timing chips to provide coarse timing using integer counter periods and fine timing using a fraction of a counter period. A memory 24 is provided for storing a plurality of timing adjust values, wherein each of the plurality of timing adjust values is associated with the beginning of a corresponding one of a plurality of frame time slots. The interaction between the RFIC 12 and the BBIC 18 is described later in the specification.

Figure 2:
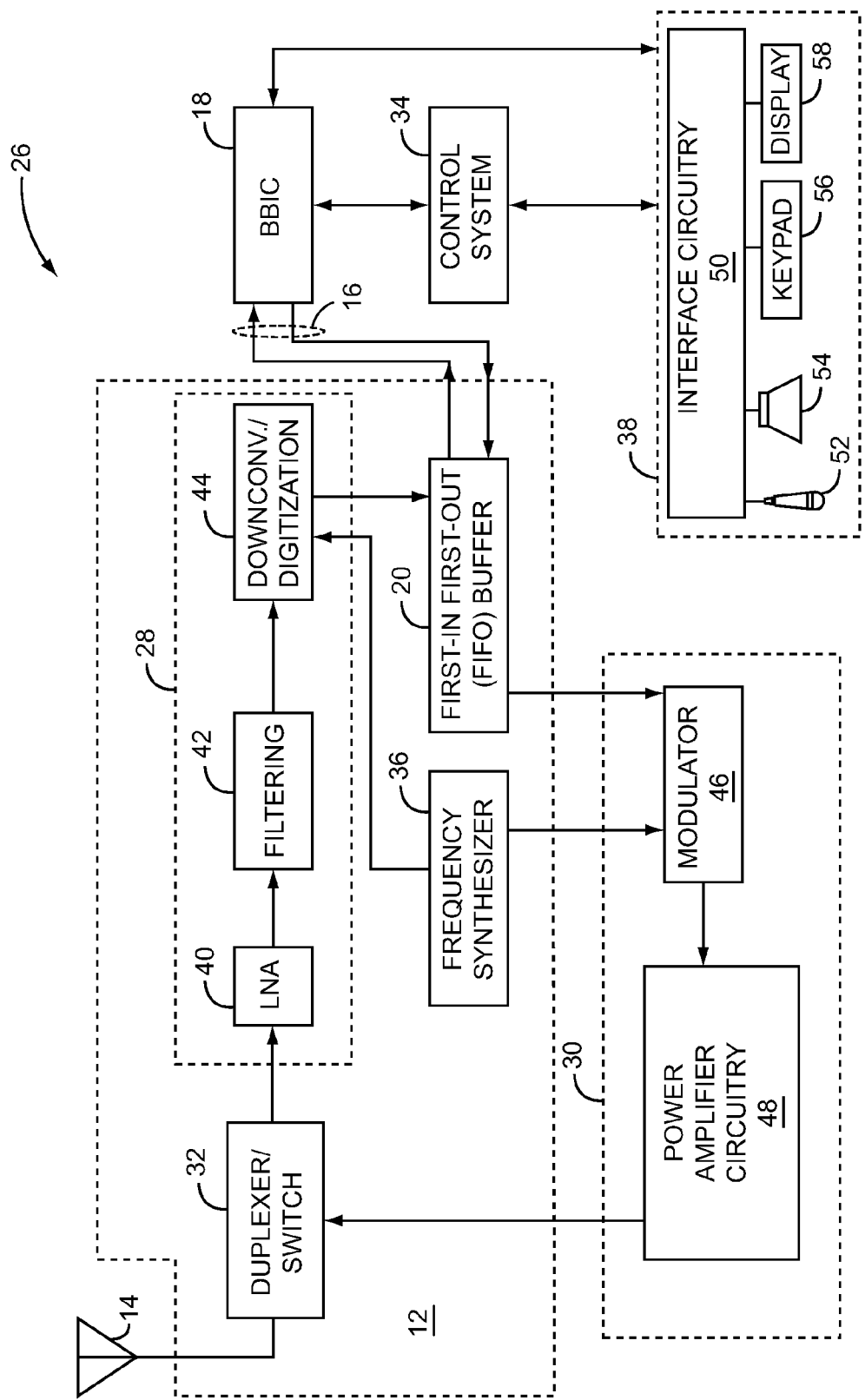
FIG. 2 depicts the timing control system of FIG. 1 incorporated in a mobile terminal.

FIG. 2 depicts the elements of the timing control system 10 (FIG. 1) incorporated in a mobile terminal 26. The basic architecture of the mobile terminal 26 may include a receiver front end 28, a radio frequency (RF) transmitter section 30, the antenna 14, a duplexer or switch 32, the BBIC 18, a control system 34, a frequency synthesizer 36, the FIFO buffer 20, and an interface 38. The receiver front end 28 receives information-bearing RF signals from one or more remote transmitters provided by a base station (not shown). A low noise amplifier (LNA) 40 amplifies the signal. A filter circuit 42 minimizes broadband interference in the received signal, while downconversion and digitization circuitry 44 downconverts the filtered received signal to an intermediate or baseband frequency signal, which is then digitized into one or more digital streams. The receiver front end 28 typically uses one or more mixing frequencies generated by the frequency synthesizer 36. The FIFO buffer 20 synchronizes with and forwards the digitized received signal to the BBIC 18 to extract the information or data bits conveyed in the received signal. This processing typically comprises demodulation, decoding, and error correction operations. As such, the BBIC 18 is generally implemented in one or more digital signal processors (DSPs).

On the transmit side, the BBIC 18 receives digitized data, which may represent voice, data, or control information, from the control system 34, which it encodes for transmission. The encoded data is output to the FIFO buffer 20, which synchronizes the encoded data with the synchronized digitized received signal. The synchronized encoded data is forwarded to the transmitter 30, where it is used by a modulator 46 to modulate a carrier signal that is at a desired transmit frequency. Power amplifier circuitry 48 amplifies the modulated carrier signal to a level appropriate for transmission, and delivers the amplified and modulated carrier signal to the antenna 14 through the duplexer or switch 32.

A user may interact with the mobile terminal 26 via the interface 38, which may include interface circuitry 50 associated with a microphone 52, a speaker 54, a keypad 56, and a display 58. The interface circuitry 50 typically includes analog-to-digital converters, digital-to-analog converters, amplifiers, and the like. Additionally, it may include a voice encoder/decoder, in which case it may communicate directly with the BBIC 18. The microphone 52 will typically convert audio input, such as the user's voice, into an electrical signal, which is then digitized and passed directly or indirectly to the BBIC 18. Audio information encoded in the received signal is recovered by the BBIC 18 and converted by the interface circuitry 50 into an analog signal suitable for driving a speaker 54. The keypad 56 and the display 58 enable the user to interact with the mobile terminal 26, inputting numbers to be dialed, address book information, or the like, as well as monitoring call progress information.

Figure 3:
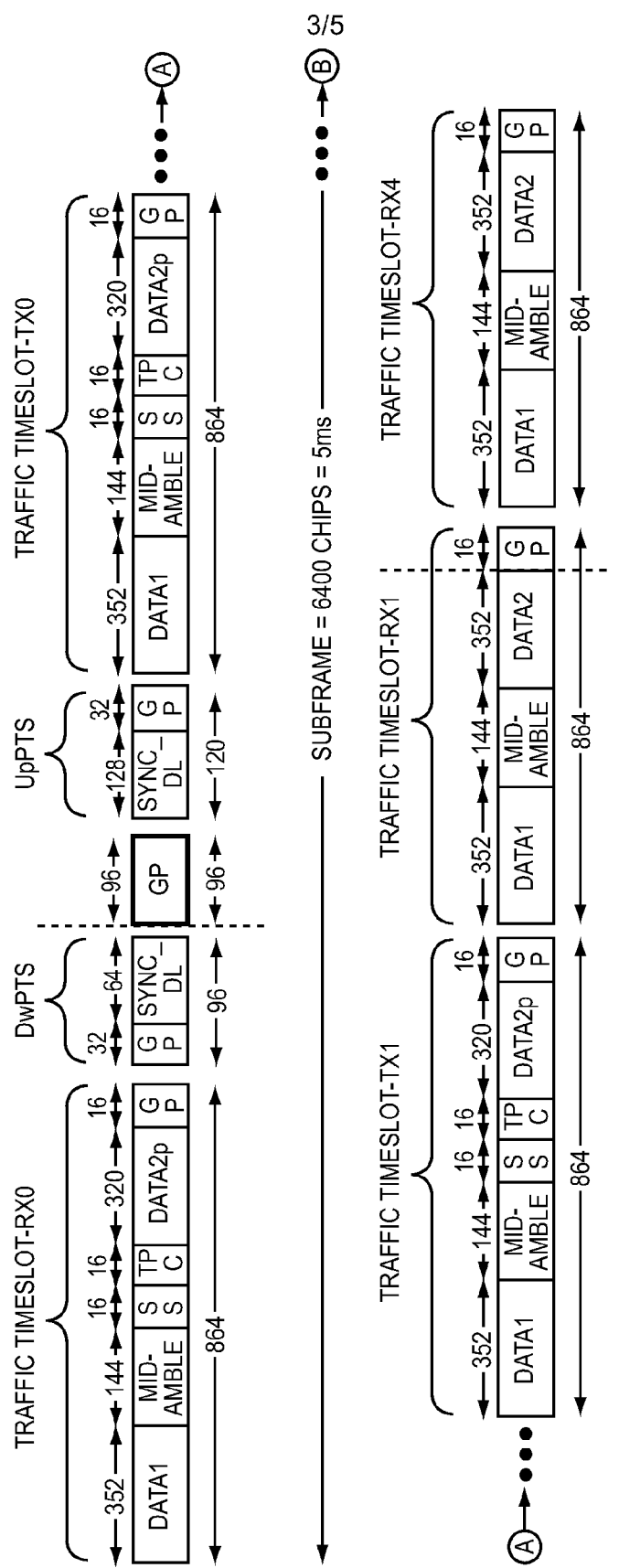
FIG. 3 depicts a typical TD-SCDMA sub-frame structure.

FIG. 3 depicts a typical TD-SCDMA sub-frame structure. The sub-frame period is 5 ms. A first time slot is used to receive data from a base station (not shown). From a user perspective, user equipment (UE) such as the mobile terminal 26 (FIG. 2) will be receiving the first time slot, which is referred to as a TRAFFIC TIMESLOT-RX0. Next, a special time slot referred to as the Downlink Pilot Tone Signal (DwPTS) is received. The DwPTS includes a 32 chip guard period (GP) and a 64 chip down link synchronization period (SYNC-DL). During the DwPTS, the base station broadcasts a signal that is receivable by all users within the range of the base station. The DwPTS is followed by a 64 chip GP, during which nothing is typically transmitted or received by the mobile terminal 26. After the GP, the mobile terminal 26 transmits a signal known as an Uplink Pilot Tone Signal (UpPTS). The UpPTS transmitted by the mobile terminal 26 can be a continuous wave (CW) signal that is receivable by the base station to determine signal qualities such as fading, etc. In particular, the UpPTS is usable during an initial Random Access Channel (RACH) burst or during initial open loop synchronization. The UpPTS is also usable during handover of a call between one base station and another base station in a cellular network. After the UpPTS transmission, the mobile terminal 26 can transmit data. The data can be transmitted in one or more time slots. The number of time slots is programmable. In the example of FIG. 3, the mobile terminal 26 is transmitting using frame time slots, which are TRAFFIC TIMESLOT-TX0 and TRAFFIC TIMESLOT TX1. Next, the mobile terminal 26 will receive data during a plurality of frame time slots referred to as TRAFFIC TIMESLOT-RX1 through TRAFFIC TIMESLOT-RX4.

A difficulty pertaining to time slot transmission timing arises when the mobile terminal 26 is at various ranges from the base station. In order for the data transmitted during the time slot to arrive at an appropriate time, a transmit time for the time slots for data to be transmitted must be adjusted. If the mobile terminal 26 is relatively far away from the base station, the base station will request that the mobile terminal 26 advance the timing of time slots such as the TRAFFIC TIMESLOT-TX0 and the TRAFFIC TIMESLOT-TX1. In contrast, the base station will not request a timing advance for the plurality of frame time slots if the mobile terminal 26 is relatively close to the base station.

In standard practice, the base station requests adjustments to the timeslot timing via the DwPTS. However, the standard practice is overly complex and relatively imprecise when adjusting a plurality of frame time slots. A goal of the present disclosure is to simplify the timing adjustment of the plurality of frame time slots using a single transmit control signal per adjustment period. The control signal known as a time accurate strobe (TAS) signal is usable to program the timing advances needed to ensure that data transmitted during the plurality of frame time slots such as TRAFFIC TIMESLOT-RX0, TRAFFIC TIMESLOT-TX0, and TRAFFIC TIMESLOT TX1 will arrive at the base station at an appropriate time. Importantly, the present disclosure requires only one TX TAS signal to realize accurate timing for the plurality of frame time slots making up a TD-SCDMA sub-frame structure.

As shown in FIG. 3, each TRAFFIC TIMESLOT-RX0, RX1, etc and TRAFFIC TIMESLOT-TX0, TX1, etc has a duration of 864 chips. The DwPTS duration and GP duration are 96 chips each, whereas the UpPTS duration is 160 chips. Note that all the TRAFFIC TIME SLOT durations are multiples of the standard DigRF3G frame payloads for RX and TX. Thus, no zero padding between RX or TX data is needed to send via a serial asynchronous Dig RF interface. A TX DigRF frame transmitted over a channel such as channel C of the DigRF channels will load 4 chips at a time in a TX FIFO.

A special group of 16 chips located between a Midamble time slot and a Transmit Power Control (TPC) time slot is known as Secondary Synchronization (SS) chips. The SS chips correspond to synchronization commands that are typically received by the mobile terminal 26 during a downlink from a base station. The SS chips may include several different synchronization commands that are usable by the mobile terminal 26 to adjust the timing of the plurality of frame time slots.

Further still, there are several Transmit Power Control (TPC) commands that are received for multiple TX time slots, which include Coded Composite Transport Channel (CCTrCH) pairs. The TPC commands received by the mobile terminal 26 from the base station during a downlink are decoded and used to adjust the various CCTrCH power levels. In contrast, a UpPTS power level is typically set in an open loop mode, while each TRAFFIC TIME SLOT is controlled either in an open loop or closed loop mode via TPC commands.

In response to a TPC command, a processor of the BBIC 18 (FIG. 1) will calculate a power delta change in dB and send an absolute power value for each of the plurality of frame time slots. If enabled, the BBIC 18 will also send a UpPTS power level to be applied via a Third Generation Time Division (3GTD) Set command. The 3GTD Set command is sent from the BBIC 18 via the asynchronous digital interface 16 (FIG. 1) as a command that is applied to the UpPTS and the plurality of frame time slots. In this case, it is preferable for the BBIC 18 to combine several TPC changes on a different CCTrCH assigned to a particular one of the plurality of frame time slots. The BBIC 18 will then decode a different timing adjustment to be applied for each one of the plurality of frame time slots based on symbols encoded in the SS chips received by the BBIC 18.

Before transmission of data, the BBIC 18 will send a TAS signal to advance or delay the UpPTS by an amount appropriate for the start of transmission. In the Hardware Abstraction Layer (HAL), the command 3GTD Set TX provides a means to calculate a counter value referred to as a TX Fire value that is based on a programming of a set of receive-transmit offset (RXTXOffset) field bits. The TX Fire value allows control of the timing of the UpPTS (or the initial plurality of frame time slots in case the UpPTS is disabled) with a resolution of +−⅛ chip over a 16-chip range. Thus the position of the TAS signal provides a timing control of 16 chips granularity while the TX Fire value provides the finer timing control resolution of +−⅛ chip.

Figure 4:
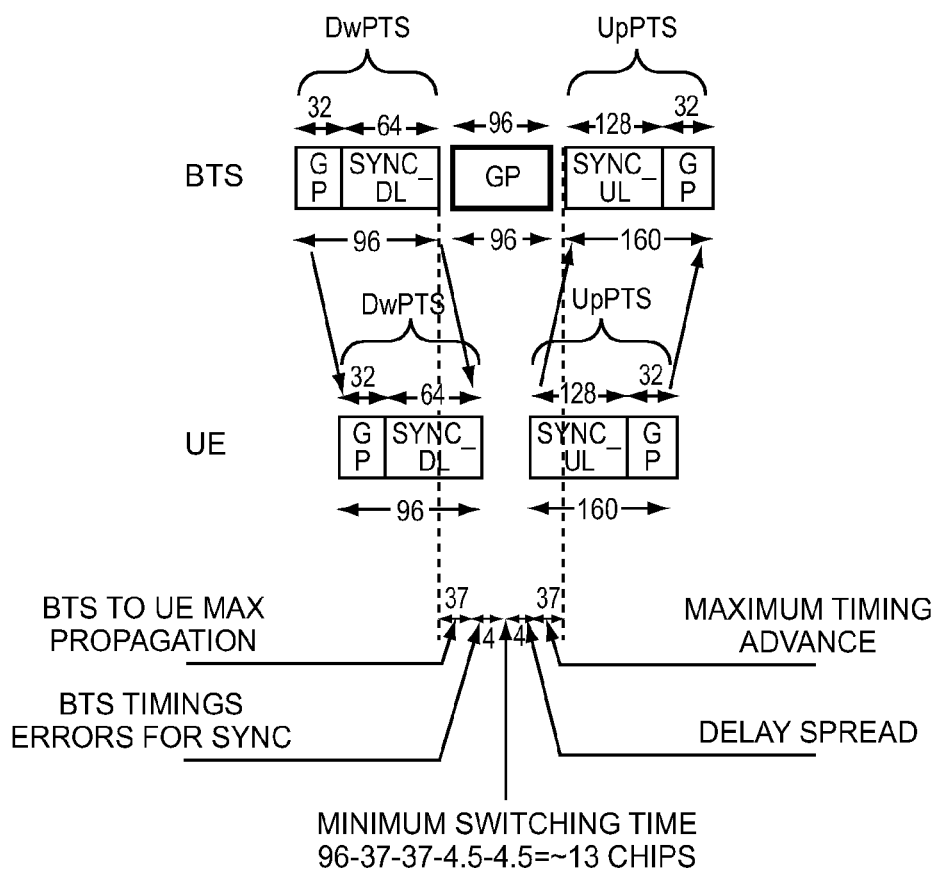
FIG. 4 illustrates a transmit (TX) switching time having a 13 chip budget.

FIG. 4 illustrates why a TX switching time is budgeted to 13 chips based on the expected distance of the mobile terminal 26 (FIG. 2) from the base station. The UpPTS includes a 128 chip up link synchronization period (SYNC-UL). In the case of making timing adjustments for the uplink traffic slots, the RFIC 12 (FIG. 1) is running in burst mode similar somewhat to second generation (2G) technology with the exception that the FIFO 20 (FIG. 1) is regularly loaded with TX data, and the timing adjustment values for each of the plurality of frame time slots are programmed via the command HAL 3GTD Set TX. Thus, a range of ~+−3.8 chips with +−⅛ chips of resolution is provided for each of the plurality of frame time slots without the need for an additional TAS signal.

Note that the FIFO 20 will only load the useful TX data for each of the plurality of frame time slots, and the transceiver will internally generate GP bits (similar to 2G). The guard period bits generated internally will correspond to zero in-phase and quadrature (I/O) samples in order to generate a natural ramp-down and a natural ramp-up.

Figure 5:
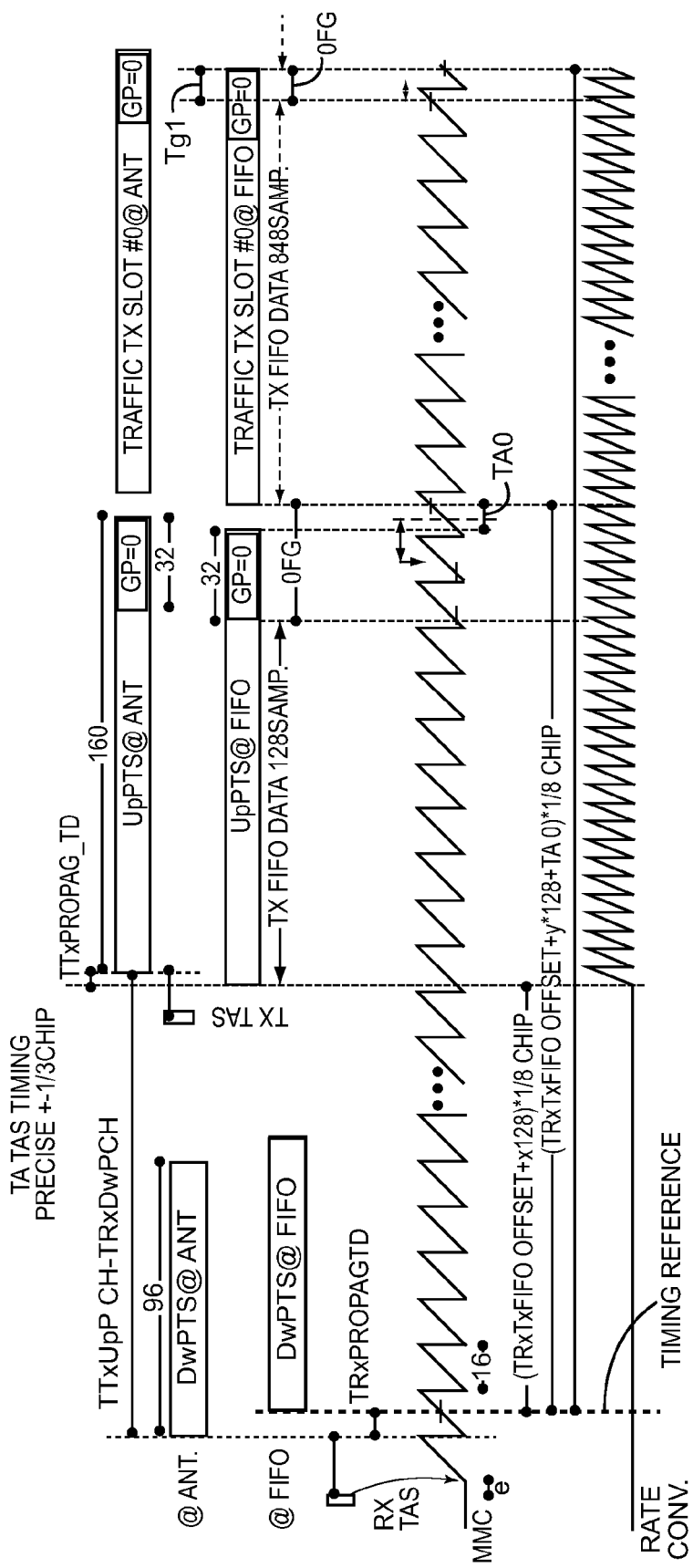
FIG. 5 is a timing diagram that illustrates an exemplary way to program the timing adjustments for each of the plurality of frame time slots.

FIG. 5 is a timing diagram that illustrates an exemplary way to program the timing adjustments for each of the plurality of frame time slots. The position of the TX TAS signal combined with a calculated TX Fire value will adjust the timing of the UpPTS, while each one of the plurality of frame time slots that follows the first one of the plurality of frame time slots is adjusted based on calculated timing adjust values. The overall transmit control operates in distributed mode, and thus does not require any extra TAS signal.

The transmit control of TD-SCDMA is similar to 2G TX where the RFIC 12 (FIG. 1) is operated in a distributed mode. In this way, the BBIC 18 (FIG. 1) programs all the timing adjust values for the plurality of frame time slots prior to the transmission of data, and will send only one TX TAS signal. Thus, the RFIC 12 will sequence the control and guard bits insertion, the start and stop of each of the plurality of frame time slots, the power level settings, the TX off gaps slots, etc., depending on the timing adjust values programmed in the HAL command 3GTD Set TX.

Those skilled in the art will recognize improvements and modifications to the preferred embodiments of the present disclosure. All such improvements and modifications are considered within the scope of the concepts disclosed herein and the claims that follow.

What is claimed is:

1. A timing control system for a Time Division Synchronous Code Division Multiple Access (TD-SCDMA) and Long Term Evolution Time Division Duplex (LTE-TDD) mobile terminal, the timing control system comprising:
    a radio frequency integrated circuit (RFIC) in communication with an antenna;
    an asynchronous digital interface in communication with the RFIC;
    a baseband integrated circuit (BBIC) adapted to perform calculations and issue commands to the RFIC via the asynchronous digital interface;
    a first-in first-out (FIFO) buffer in communication with the RFIC and the BBIC for buffering transmit (TX) frame data and receive (RX) frame data;
    a memory for storing a plurality of timing adjust values, wherein each of the plurality of timing adjust values is associated with the beginning of a corresponding one of a plurality of frame time slots;
    a modulo counter having a maximum count value per counter period, the modulo counter in communication with the RFIC and the BBIC for counting an integer number of timing chips, wherein the modulo counter is initiated by an RX time accurate strobe (TAS) signal that commands an initial counter value to be recorded in the memory when an external message arrives in the FIFO buffer from the antenna after a propagation delay through the RFIC, and wherein the BBIC calculates an integer number of counter periods and a fraction of a counter period corresponding to a timing correction value received from a base station, and wherein the BBIC issues a TX TAS signal during a counter period that occurs at the integer number of counter periods, and wherein an expiration of the fraction of an ensuing counter period commands an internal message for a first one of the plurality of frame time slots to be sent from the FIFO buffer to the antenna via the RFIC.

2. The timing control system of claim 1, wherein the BBIC calculates, then stores in the memory, the plurality of timing adjust values for each one of the plurality of frame time slots that follows the first one of the plurality of frame time slots, so that the each one of the plurality of frame time slots can be time adjusted during message transmissions without an issuance of an additional TX TAS.

3. The timing control system of claim 1, wherein the BBIC is further adapted to issue a command having a field to indicate that one of the plurality of frame time slots is an Uplink Pilot Tone Signal (UpPTS).

4. The timing control system of claim 1, wherein the plurality of timing adjust values comprises positive values for retarding the beginning of the corresponding one of the plurality of frame time slots.

5. The timing control system of claim 1, wherein the plurality of timing adjust values comprises negative values for advancing the beginning of the corresponding one of the plurality of frame time slots.

6. The timing control system of claim 1, wherein a duration of each one of the plurality of frame time slots for transmission has a fixed predetermined value.

7. The timing control system of claim 6, wherein the fixed predetermined value for the duration of the each one of the plurality of frame time slots for transmission is a multiple of a predetermined number of chips.

8. The timing control system of claim 1, wherein the each of the plurality of timing adjust values is a fraction of an ensuing counter period after the integer number of counter periods.

9. The timing control system of claim 8, wherein the each of the plurality of timing adjust values has a resolution of ⅛ of a chip.

10. The timing control system of claim 1, wherein the plurality of frame time slots comprises an RX time slot, a Downlink Pilot Tone Signal (DwPTS), a Guard Period (GP), a UpPTS, and six TX time slots.

11. The timing control system of claim 10, wherein the plurality of timing adjust values for each one of the plurality of frame time slots are based upon synchronization signal (SS) bits provided by a base station.

12. The timing control system of claim 10, wherein individual ones of the six TX time slots are reprogrammable as RX time slots or as null time slots or combinations thereof via a single command from the BBIC.

13. A mobile terminal for TD-SCDMA and LTE-TDD comprising:
an antenna for transmitting and receiving messages;
a RFIC in communication with the antenna;
an asynchronous digital interface in communication with the RFIC;
a BBIC adapted to perform calculations and issue commands to the RFIC via the asynchronous digital interface;
a FIFO buffer in communication with the RFIC and the BBIC for buffering TX frame data and RX frame data;
a memory for storing a plurality of timing adjust values, wherein each of the plurality of timing adjust values is associated with the beginning of a corresponding one of a plurality of frame time slots;
a modulo counter having a maximum count value per counter period, the modulo counter in communication with the RFIC and the BBIC for counting an integer number of timing chips, wherein the modulo counter is initiated by an RX TAS signal that commands an initial counter value to be recorded in the memory when an external message arrives in the FIFO buffer from the antenna after a propagation delay through the RFIC, and wherein the BBIC calculates an integer number of counter periods and a fraction of a counter period corresponding to a timing correction value received from a base station, and wherein the BBIC issues a TX TAS signal during a counter period that occurs at the integer number of counter periods, and wherein an expiration of the fraction of an ensuing counter period commands an internal message for a first one of the plurality of frame time slots to be sent from the FIFO buffer to the antenna via the RFIC.

14. The mobile terminal of claim 13, wherein the BBIC calculates, then stores in the memory, the plurality of timing adjust values for each one of the plurality of frame time slots that follows the first one of the plurality of frame time slots, so that the each one of the plurality of frame time slots can be time adjusted during message transmissions without an issuance of an additional TX TAS.

15. The mobile terminal of claim 13, wherein the BBIC is further adapted to issue a command having a field to indicate that one of the plurality of frame time slots is a UpPTS.

16. The mobile terminal of claim 13, wherein the plurality of timing adjust values comprises positive values for retarding the beginning of the corresponding one of the plurality of frame time slots.

17. The mobile terminal of claim 13, wherein the plurality of timing adjust values comprises negative values for advancing the beginning of the corresponding one of the plurality of frame time slots.

18. The mobile terminal of claim 13, wherein a duration of each one of the plurality of frame time slots for transmission has a fixed predetermined value.

19. The mobile terminal of claim 18, wherein the fixed predetermined value for the duration of the each one of the plurality of frame time slots for transmission is a multiple of a predetermined number of chips.

20. The mobile terminal of claim 13, wherein the each of the plurality of timing adjust values is a fraction of an ensuing counter period after the integer number of counter periods.

21. The mobile terminal of claim 20, wherein the each of the plurality of timing adjust values has a resolution of ⅛ of a chip.

22. A method of providing precise timing control of TD-SCDMA and LTE-TDD communication between a base station and a mobile terminal via an asynchronous digital interface, the method comprising:
receiving via the mobile terminal from the base station a message having a timing correction value;
initiating a modulo counter of the mobile terminal to begin counting fractions of a chip upon a reception of an RX TAS signal;
recording in a memory of the mobile terminal a count value of the modulo counter at the instant the message enters a FIFO buffer of the mobile terminal;
calculating an integer number of modulo counter periods and a fraction of a modulo counter period that corresponds to the timing correction value;
issuing a TX TAS signal during a modulo counter period that occurs at the integer number of modulo counter periods; and
sending a message from the FIFO buffer to an antenna of the mobile terminal at an expiration of the fraction of a modulo counter period that occurs immediately after the integer number of modulo counter periods.

23. The method of claim 22, further including calculating, and storing via a BBIC of the mobile terminal, a plurality of timing adjust values for each one of a plurality of frame time slots that follows a first one of the plurality of frame time slots, so that the each one of the plurality of frame time slots can be time adjusted during message transmissions without an issuance of an additional TX TAS signal.

24. The method claim 23, further including issuing via the BBIC a command having a field to indicate that one of the plurality of frame time slots is aUpPTS.

25. The method of claim 23, wherein the plurality of timing adjust values are positive values for retarding a beginning of a corresponding one of the plurality of frame time slots.

26. The method of claim 23, wherein the plurality of timing adjust values are negative values for advancing a beginning of a corresponding one of the plurality of frame time slots.

27. The method of claim 23, wherein a duration of the each one of the plurality of frame time slots for transmission has a fixed predetermined value.

28. The method of claim 27, wherein the fixed predetermined value for the duration of the each one of the plurality of frame time slots for transmission is a multiple of sixteen chips.

29. The method of claim 23, wherein the each of the plurality of timing adjust values is a fraction of an ensuing counter period after the integer number of modulo counter periods.

30. The method of claim 23, wherein the each of the plurality of timing adjust values has a resolution of ⅛ of a chip.

31. The method of claim 23, wherein the plurality of frame time slots comprises an RX time slot, a DwPTS, a GP, a UpPTS, and six TX time slots.

32. The method of claim 31, wherein the plurality of timing adjust values for the each one of the plurality of frame time slots is based upon synchronization signal (SS) bits provided by the base station.

33. The method of claim 31, wherein individual ones of the six TX time slots are reprogrammable as RX time slots or as null time slots or combinations thereof via a single command.

* * * * *